No. 856,836. PATENTED JUNE 11, 1907.
W. T. & C. C. BARBER.
PHOTOGRAPHIC SHUTTER.
APPLICATION FILED MAY 22, 1906.

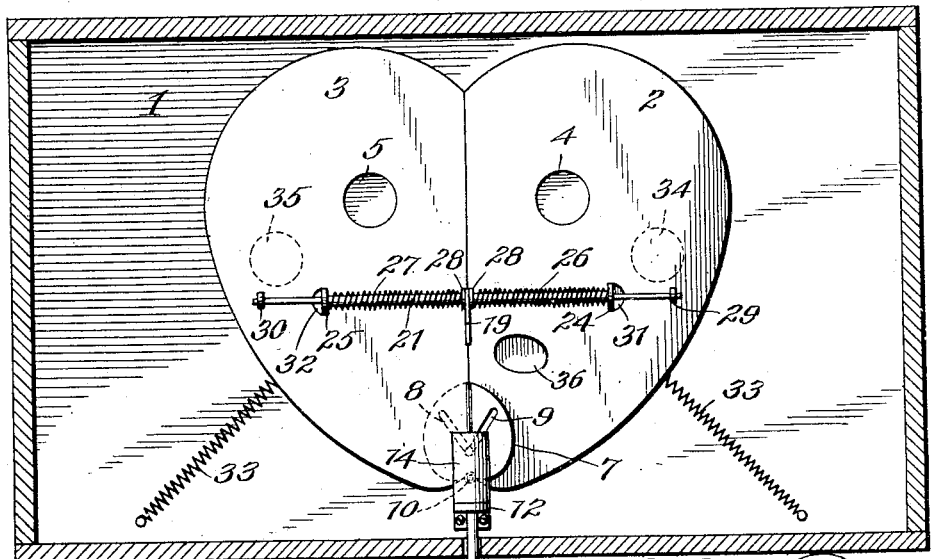
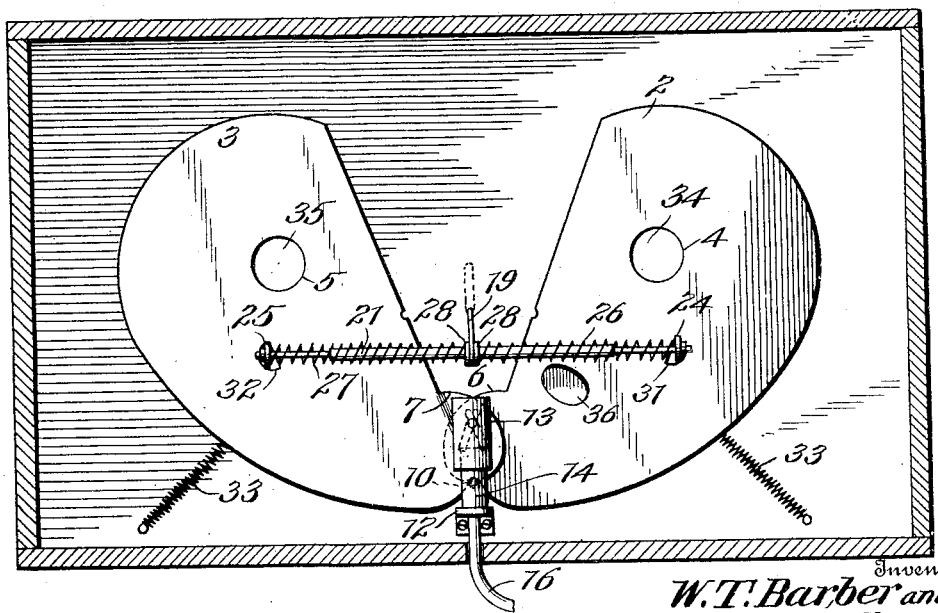

4 SHEETS—SHEET 2.

Witnesses
M. C. Lyddane
S. W. FitzGerald

Inventors
W. T. Barber and
C. C. Barber
By
W. J. FitzGerald
Attorneys

THE NORRIS PETERS CO., WASHINGTON, D. C.

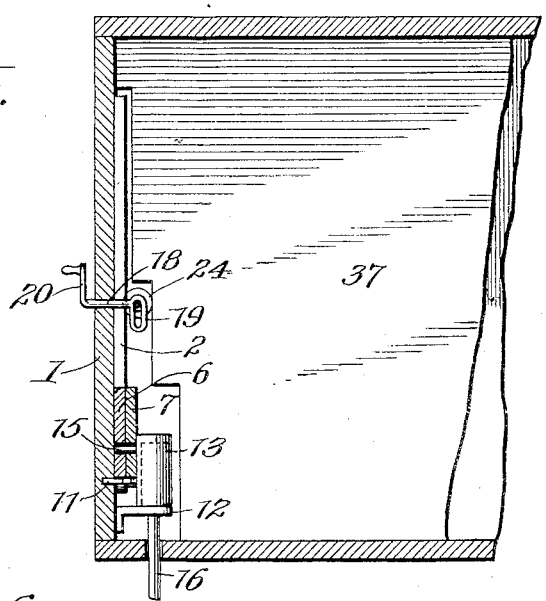
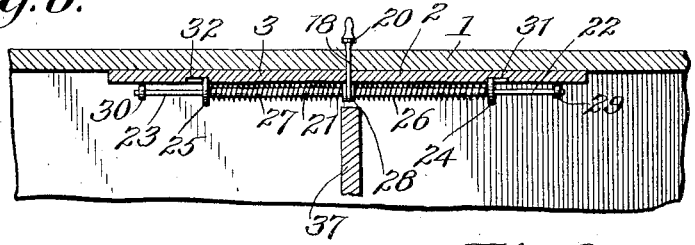
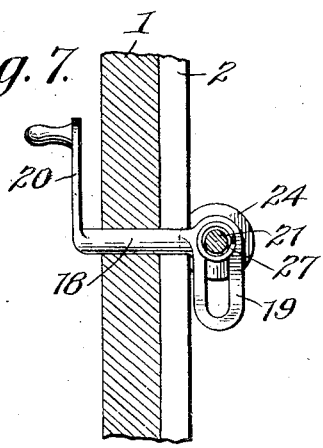
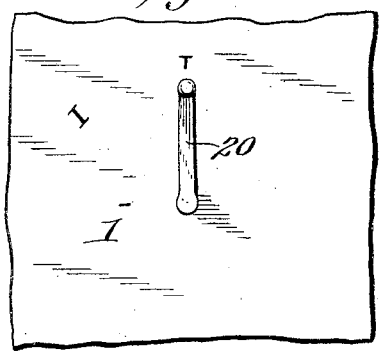

No. 856,836. PATENTED JUNE 11, 1907.
W. T. & C. C. BARBER.
PHOTOGRAPHIC SHUTTER.
APPLICATION FILED MAY 22, 1906.

4 SHEETS—SHEET 4.

Witnesses
M. C. Lyddane
E. F. Gill

Inventors
W. T. Barber and
C. C. Barber
By W. J. Fitzgerald & Co.
Attorneys

UNITED STATES PATENT OFFICE.

WILLIAM T. BARBER AND CHARLIE C. BARBER, OF SHELBYVILLE, TENNESSEE.

PHOTOGRAPHIC SHUTTER.

No. 856,836.　　　Specification of Letters Patent.　　　Patented June 11, 1907.

Application filed May 22, 1906. Serial No. 318,191.

*To all whom it may concern:*

Be it known that we, WILLIAM T. BARBER and CHARLIE C. BARBER, citizens of the United States, residing at Shelbyville, in the county of Bedford and State of Tennessee, have invented certain new and useful Improvements in Photographic Shutters; and we do hereby declare the following to be a full, clear, and exact description of the invention, such as will enable others skilled in the art to which it appertains to make and use the same.

Our invention relates to new and useful improvements in camera shutters and more particularly to that class adapted to be used in connection with cameras where two exposures of the same object are made at the same time.

Our object is to provide a shutter of this class which will be cheap, durable and efficient and one that can be varied to take a time or instantaneous exposure.

Other objects and advantages will be more clearly set forth in the accompanying specification and pointed out in the claims.

In the accompanying drawings which are made a part of this application, we have shown the preferred form of our invention.

Figure 3:
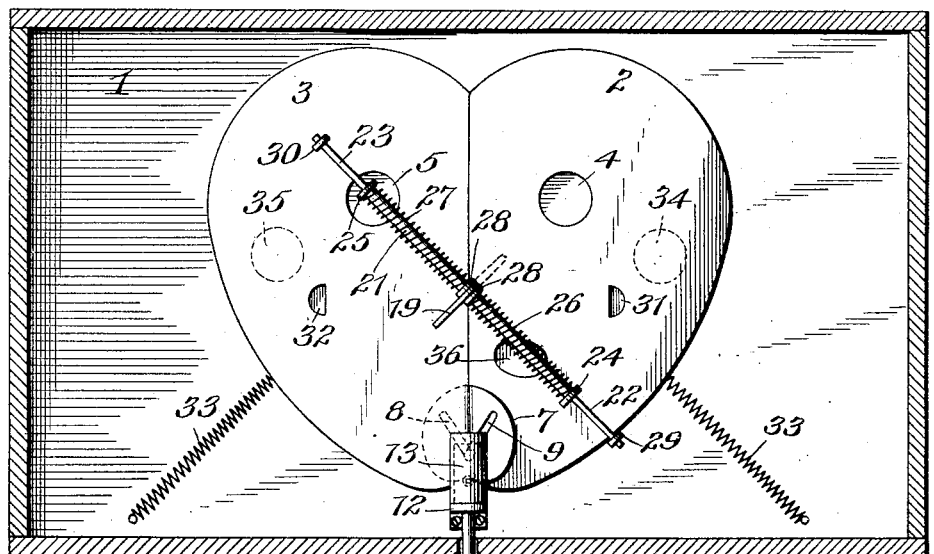
Figure 4:
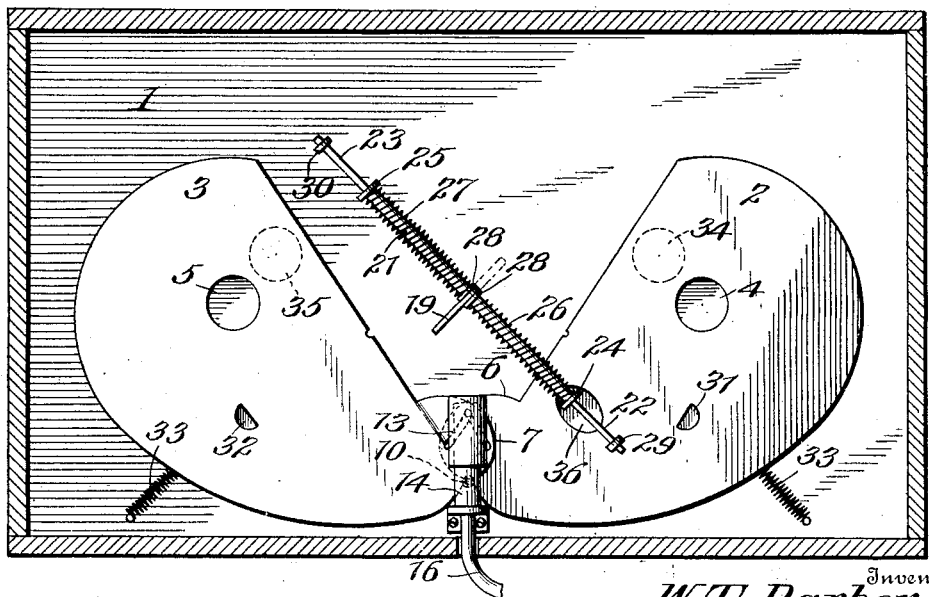
Figure 9:
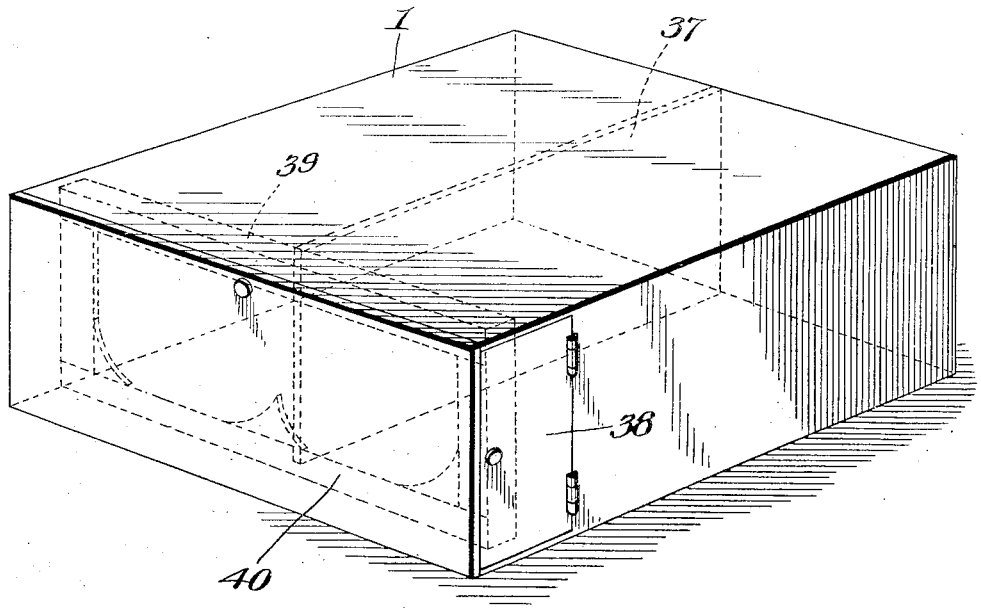

In said drawings:—Figure 1 is a plan view of our improved shutter and attachments therefor shown in position to take time exposures, the camera frame being shown in section, and with the shutter closed. Fig. 2 is a similar view showing the shutter open as when taking a time exposure. Fig. 3 is a similar view to Fig. 1 showing the parts adjusted to take a snap-shot. Fig. 4 is a view similar to Fig. 3 showing the position of the parts after an instantaneous exposure has been made. Fig. 5 is a vertical central sectional view through the shutter and the adjacent parts of the camera. Fig. 6 is a transverse sectional view of the shutter and the adjacent parts of the camera. Fig. 7 is a view similar to Fig. 5 showing the parts on an enlarged scale. Fig. 8 is a plan view of the time controlling lever and the adjacent parts of the camera frame, and, Fig. 9 is a perspective view of the camera frame showing parts thereof in dotted lines.

Referring to the figures by numerals of reference, 1 indicates the usual frame or housing for the camera which may be constructed in any preferred shape and of any preferred material. Secured to the inner face of one side of said camera is our improved form of shutter, said shutter comprising a pair of coöperating plates 2 and 3, said plates being provided with exposure openings 4 and 5 respectively. Each of the plates 2 and 3 are provided at one end with a projection 6 and 7 respectively, said projections having oppositely disposed slots 8 and 9 respectively, said slots being so arranged that when the plates are abutted against each other, as shown in Figs. 1 and 3, their lower ends will register with each other. The plates 2 and 3 are hinged together at their lower ends as shown at 10. The pin 11 uniting the hinged portions of said plates 2 and 3 is extended into the frame 1, thereby pivotally securing said plates 2 and 3 to said frame.

Secured to the frame 1 in juxta-position to the hinge 10 is a bracket 12, said bracket forming a support for the shutter controlling device, said device comprising telescoping members 13 and 14, the member 14 being rigidly secured to the bracket 12 and the member 13 being designed to move longitudinally on the member 14. Secured to the under side of the member 13 is a stop pin 15, said pin being disposed in the slots 8 and 9 in the plates 2 and 3 so that when the member 13 is moved upwardly or downwardly upon the member 14, the shutter will be opened or closed.

A tube 16 is operatively connected to the member 14 and extends through an opening in the frame 1 and has at its outer end a compression bulb 17 by which means the movement of the member 13 is controlled. Rotatably mounted in the frame 1 and in line with the meeting point of the plates 2 and 3 is a shaft 18, said shaft being provided on its inner end with an elongated link member 19 and at its outer end with a controlling handle 20. Movably mounted in the link 19 and disposed across the members 2 and 3 is a shaft 21, said shaft being reduced at its opposite ends to form spindles 22 and 23 upon which are rotatably mounted wheels 24 and 25 respectively, said wheels being operatively connected to springs 26 and 27 respectively, said springs being disposed around the shaft 21 and having their inner ends connected to collars 28, one of which is disposed on each side of the link 19. The outward movement of the wheels 24 and 25 is limited by means of stops 29 and 30 respectively which are adjustably secured to the spindles 22 and 23. The wheels 24 and 25 are normally disposed into engagement with semi-circular openings 31 and 32 in the plates 2 and 3 respectively, the object of which will be hereinafter set forth. Each of the plates 2 and 3 is provided with a tension spring 33, one end of which is secured to the adjoining plate and the opposite end to a convenient point of the frame 1, the object of said springs being to assist in operating the plates when an exposure is being made.

By disposing the shaft 21 above the pivot point of the shutters 2 and 3, it will be seen that when said shutters are opened as shown in Fig. 2 of the drawings the openings 31 and 32 will be in a lower plane than when the shutters are closed as shown in Fig. 1 of the drawing, thereby causing the shaft to assume a lower horizontal plane when the shutters are opened and for this reason we have provided the link 19 with an elongated slot so that when the shutters are closed the shaft 21 will rest in the upper end of the slot and when the shutters are opened the shaft will be carried to the lower end of the slot thereby retaining the wheels 24 and 25 in the semi-circular openings 31 and 32 at all times when the camera is being used for taking a time exposure.

In operation, when it is desired to make a time exposure, pressure is brought to bear upon the bulb 17 whereupon the member 13 will be directed upward upon the member 14 and through the medium of pin 15 extending into the slots 8 and 9, the plates 2 and 3 will be moved apart until the openings 4 and 5 are disposed over the lenses 34 and 35 respectively. When the plates 2 and 3 are thus disposed away from each other, the wheels 24 and 25 will be moved longitudinally on the spindles 22 and 23 until said wheels come in contact with the stops 29 and 30 at the end of said spindles, thereby limiting the movement of the plates 2 and 3 and disposing the openings 4 and 5 over the lenses 34 and 35. The tension of the springs 26 and 27 is partially overcome through the action of the tension springs 33 so that with the coöperation of the telescoping members 13 and 14, the plates 2 and 3 are rapidly disposed in their open position. As soon as the pressure upon the bulb 17 is released, the contraction of the springs 26 and 27 will return the plates 2 and 3 to their closed position, the tension of the springs 26 and 27 being sufficient to overcome the tension upon the springs 33. It will readily be understood that the time of the exposure can be controlled by retaining the pressure upon the bulb 17, the action of the air upon the members 13 and 14 and the tension of the springs 33 being great enough to overcome the tension of the springs 26 and 27 and to hold said plates in their open position.

When it is desired to make an instantaneous exposure, the shaft 18 is partially rotated by means of the crank 20, thereby disposing the shaft 21 to the position shown in Figs. 3 and 4 of the drawings, moving the wheels 24 and 25 out of engagement with the semi-circular openings 31 and 32 so that the plates 2 and 3 will be relieved of the tension of the springs 26 and 27 and allowing them to move more freely apart. As the plates 2 and 3 are being opened or moved away from each other, and the openings 4 and 5 have reached a point adjacent to the lenses 34 and 35, the wheel 25 will have passed from off the plate 3 and the wheel 24 moved into an oblong opening 36, thereby removing the pressure from off said plates 2 and 3 whereupon the springs 33 and the air pressure in the members 13 and 14 will cause said shutters to be moved rapidly across the faces of the lenses 34 and 35, the openings 4 and 5 being disposed beyond the lenses 34 and 35 as clearly shown in Fig. 4 of the drawings. When the device is thus used for instantaneous exposures, the pin 15 travels the full length of the slots 8 and 9 thereby imparting a greater movement to the plates 2 and 3 than would be possible when using said parts for time exposures owing to the fact that when the shaft 21 is disposed as shown in Figs. 3 and 4 the stops do not operate to limit the movement of said plates.

When the shaft 21 has been turned to the position shown in Figs. 3 and 4 of the drawings thereby removing the tension of the springs 26 and 27 from the shutters the springs 33 are prevented from opening the shutters by means of the pin 15, the tension of the springs 33 not being sufficient to raise the telescoping member 13 thereby holding the shutters in their closed position until such time as air is directed against the telescoping member 13 by pressing the bulb 17.

After the exposure has been made, the pressure is released from off the bulb 17 and the suction caused by said bulb assuming its normal position will dispose the shutters toward each other and the rod 21 is again moved to its horizontal position and the plates 2 and 3 held in their normal closed position until such time as it is desired to make another exposure.

To enable the operator to ascertain when the shaft 21 is properly disposed to take a time or instantaneous exposures, the face of the camera is provided at one point with the letter "T" and at another point with the letter "I" so that when the crank 20 is registering with the letter "T," it will be readily understood that it will take a time exposure and when said crank is registering with the letter "I" an instantaneous exposure will be made.

In Fig. 9 of the drawings we have shown our perferred form of camera, said camera being divided into compartments by means of a centrally disposed partition 37, said partition extending from the front end of the camera to a point near the rear end thereof. One edge of the frame 1 is also provided with a door 38 through which the plate frame 39 is inserted while one end of the frame is provided with a door 40 whereby access may be had to a ground-glass through which the object bring photographed may be seen and by which means the camera may be properly focused.

What I claim is:—

1. In a device of the class described, the combination with a camera frame having lenses therein; of plates pivotally secured to said frame and having openings therein, projections at the lower ends of said plates, said projections having elongated slots, means coöperating with said slots to open said plates, and additional means to control the movement of said plates.

2. In a device of the class described, the combination with a camera frame; of plates pivotally mounted upon said frame and having openings therein adapted to register with lenses carried by the frame, and means to simultaneously move said plates toward or from each other.

3. In a device of the class described, the combination with a frame having lenses therein; of plates pivotally mounted upon said frame and hinged together at their lower ends, said plates having openings therein adapted to register with the lenses in the frame, a shaft disposed across the face of said plates, means carried by said shaft to limit the movement of said plates, and additional means carried by said shaft to return said plates to their normal closed position.

4. In a device of the class described, the combination with a frame having lenses therein; of plates hinged together at their lower ends and pivotally secured to said frame, means to rotate said plates on their pivot and dispose openings in said plates over said lenses, a shaft rotatably mounted in said frame, a link at the inner end of said shaft, a horizontally disposed shaft mounted in said link, spindles at the outer ends of said shaft, wheels mounted upon said spindles, means to normally hold said wheels at the inner ends of said spindles, and means at the outer end of said spindles to limit the outward movement of said wheels whereby the movement of said plates in one direction will be limited.

In testimony whereof we have signed our names to this specification in the presence of two subscribing witnesses.

WILLIAM T. BARBER.
CHARLIE C. BARBER.

Witnesses:
R. A. POTTS,
E. R. CROWELL.